O. A. GOHMERT.
DISCHARGE NOZZLE.
APPLICATION FILED JUNE 19, 1916.
1,272,031.
Patented July 9, 1918.
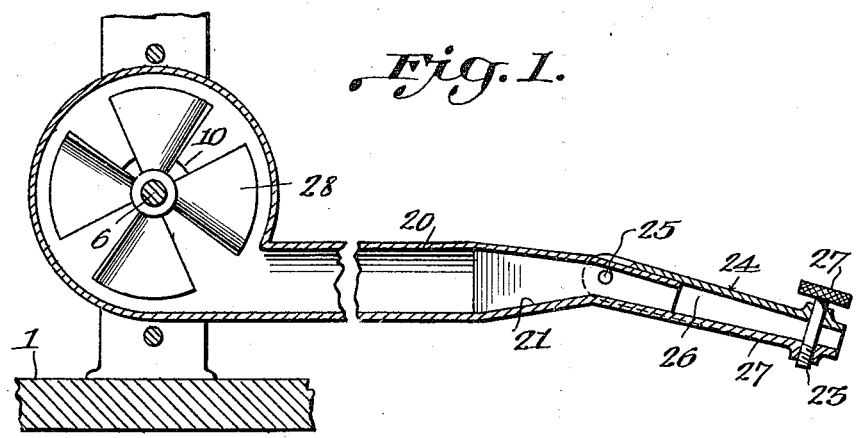
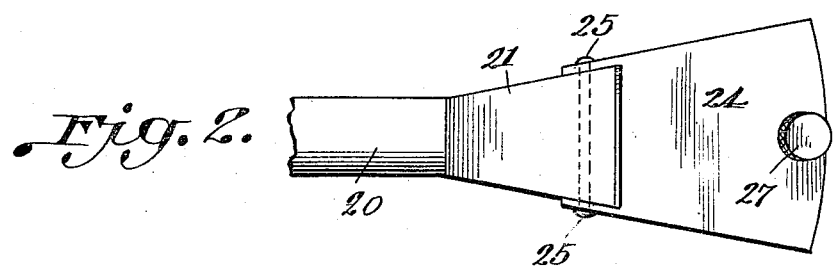
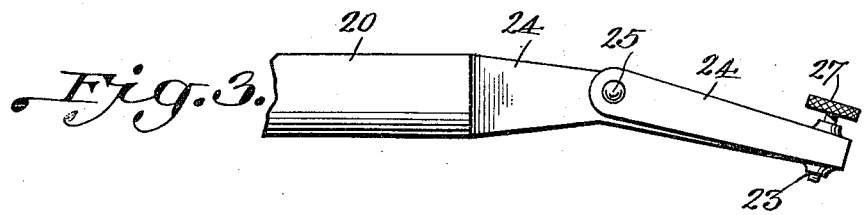
Inventor,
Otto A. Gohmert,
by Richard B. Owen
Atty.

UNITED STATES PATENT OFFICE.

OTTO ADOLPH GOHMERT, OF YORKTOWN, TEXAS.

DISCHARGE-NOZZLE.

1,272,031.  Specification of Letters Patent.  Patented July 9, 1918.

Application filed June 19, 1916. Serial No. 104,583.

*To all whom it may concern:*

Be it known that I, OTTO A. GOHMERT, a citizen of the United States, residing at Yorktown, in the county of Dewitt and States of Texas, have invented certain new and useful Improvements in Discharge-Nozzles, of which the following is a specification.

This invention has relation to discharge nozzles for insecticide spraying machines, and has for an object to provide a nozzle designed particularly to direct powdered insecticide and to that end comprises relatively movable plates having means for adjusting the distance therebetween whereby the aperture of the nozzle may be varied to vary the quantity of insecticide to scatter it over a unit area of field.

In addition to the foregoing, my invention comprehends improvements in the details of construction and arrangement of parts to be hereinafter described and particularly pointed out in the appended claim.

Figure 1, is a vertical section taken through the nozzle,

Fig. 2, is a detail view in side elevation of the nozzle, and

Fig. 3, is a detail view in top plan of the nozzle shown in the preceding view.

With reference to the drawings, 1 is a supporting frame and 20 indicates a blower tube which is provided at its outer end with a flattened nozzle 21 which is formed with a stationary lower lip 22 having a threaded aperture 23. A movable upper lip 24, is provided, pivoted at 25 to the sides of the nozzle and adapted to form a variable narrow opening between the lips. The sides of the nozzle 21, and the sides 26 of the upper lip 24 are outwardly diverging so as to form a flat broad spray of the material projected through the nozzle. The upper lip is formed with an opening in alinement with the opening 23 of the lower lip, and a set screw 27 is extended through said opening thereby providing means for varying the opening between the lips. 28 is a fan or blower mounted on a shaft 6, which takes the insecticide from an opening 10 and delivers it to the tube 20.

This nozzle is designed for embodiment in a spraying machine of the type including a blower whereby powdered insecticide may be discharged through the nozzle for distribution over a field. The rate of discharge of the material, or the quantity discharged per unit time may be varied by rotating the set screw 27, so as to cause relative movement of the upper lip, and thereby vary the width of the discharge opening of the nozzle.

While I have illustrated and described my invention with some degree of particularity, it is obvious that many changes may be made therein; I therefore desire to reserve the right and privilege of changing the form of the details of construction or otherwise altering the arrangement of parts without departing from the spirit of the invention, or the scope of the appended claim.

Having thus described my invention what I claim as new and desire to secure by Letters Patent is:—

In an insecticide distributer, a discharge spout, a nozzle therefor including a plate having opposite edges outwardly diverging and the smaller end of the plate integrally secured to the discharge pipe, side walls formed upon the diverging edges of said plate, a cover plate for said nozzle having opposite edges outwardly diverging, and having its diverging edges bent at right angles to embrace the walls of the bottom plate, a pin entering said walls and edges of the top and bottom plates, said bottom plate having a threaded aperture adjacent its outer edge and the top plate a smooth opening for registration therewith, and an adjusting screw penetrating the openings whereby to space the plates, toward or away from each other.

In testimony whereof I affix my signature in presence of two witnesses.

OTTO ADOLPH GOHMERT.

Witnesses:
  H. F. JUNKER,
  C. K. HARRINGTON.

Copies of this patent may be obtained for five cents each, by addressing the "Commissioner of Patents, Washington, D. C."